(12) United States Patent
Gunther

(10) Patent No.: US 6,996,229 B2
(45) Date of Patent: Feb. 7, 2006

(54) ECHO CANCELLATION FILTER

(75) Inventor: Jacob H. Gunther, North Logan, UT (US)

(73) Assignee: Utah State University, North Logan, UT (US)

( * ) Notice: Subject to any disclaimer, the term of this patent is extended or adjusted under 35 U.S.C. 154(b) by 0 days.

(21) Appl. No.: 10/616,001

(22) Filed: Jul. 9, 2003

(65) Prior Publication Data

US 2005/0008144 A1    Jan. 13, 2005

(51) Int. Cl.
*H04M 1/00*    (2006.01)
(52) U.S. Cl. ............................ 379/406.06; 379/406.08; 379/406.11
(58) Field of Classification Search ............... 381/71.1, 381/71.2, 71.4, 71.13, 94.1, 94.2, 94.3; 379/406.01, 379/406.06, 406.08, 406.11
See application file for complete search history.

(56) References Cited

U.S. PATENT DOCUMENTS

| | | | |
|---|---|---|---|
| 4,131,767 A | 12/1978 | Weinstein | 179/170.2 |
| 4,268,727 A | 5/1981 | Agrawal et al. | 179/170.2 |
| 4,712,235 A | 12/1987 | Jones, Jr. | 379/410 |
| 5,295,136 A | 3/1994 | Ashley et al. | 370/32.1 |
| 5,390,250 A | 2/1995 | Janse et al. | 379/410 |
| RE35,574 E | 7/1997 | Russell et al. | 380/6 |
| 5,694,474 A | 12/1997 | Ngo et al. | 381/66 |
| 5,764,753 A | 6/1998 | McCaslin et al. | 379/389 |
| 6,002,776 A | 12/1999 | Bhadkamkar et al. | 381/66 |
| 6,151,397 A * | 11/2000 | Jackson et al. | 381/71.4 |
| 6,181,794 B1 | 1/2001 | Park et al. | 379/410 |
| 6,272,106 B1 | 8/2001 | Kawahara et al. | 370/201 |
| 6,434,110 B1 | 8/2002 | Hemkumar | 370/201 |
| 6,507,653 B1 | 1/2003 | Romesburg | 379/406.05 |
| 6,516,050 B1 | 2/2003 | Tasaki et al. | 379/3 |
| 6,522,747 B1 * | 2/2003 | Reilly et al. | 379/406.14 |
| 6,529,606 B1 | 3/2003 | Jackson, Jr. II et al. | 381/71.4 |
| 2002/0114445 A1 | 8/2002 | Benesty et al. | 379/406.01 |
| 2002/0181699 A1 | 12/2002 | Pham et al. | 379/406.08 |
| 2002/0191779 A1 | 12/2002 | Pham | 379/406.08 |

OTHER PUBLICATIONS

International Searching Authority, International Search Report for PCT/US04/17897, dated Jan. 3, 2005, 2 pages.
International Searching Authority, Written Opinion of the International Searching Authority for PCT/US04/17897, dated Jan. 3, 2005, 3 pages.
Schobben et al., "A Frequency Domain Blind Signal Separation Method Based on Decorrelation," IEEE Transactions on Signal Processing, vol. 50, No. 8, Aug. 2002, pp. 1855-1865, no day.
Torkkola, Karl, "Blind Deconvolution, Information Maximization and Recursive Filters," Motorola, Phoenix Corporate Research Laboratories, 2100 East Elliot Road, MD EL508, Tempe, AZ 85284, USA, 4 pgs., no date.

(Continued)

*Primary Examiner*—Jefferey F. Harold
(74) *Attorney, Agent, or Firm*—John R. Thompson; Stoel Rives LLP

(57) ABSTRACT

An echo canceler includes an adaptable filter that is updated during double-talk and far-end talk. The echo canceler receives a microphone signal that includes a near-end signal and echoes resulting from a far-end signal. The echo canceler whitens the far-end signal and decorrelates the microphone signal. The whitening and decorrelating is done as a preprocessing step for the one-unit blind source separation algorithm. A criterion of measure is used to emphasize the statistical independence of the echo canceled signal and the far-end signal. The echo cancellation problem is cast as a one-unit blind source separation problem. A one-unit blind source separation algorithm such as negentropy maximization can be used to extract the echo canceled signal.

23 Claims, 6 Drawing Sheets

OTHER PUBLICATIONS

Torkkola, Karl, "IRR Filters for Blind Deconvolution using Information Maximization," Motorola, Phoenix Corporate Research Laboratories, 2100 East Elliot Road, MD EL508, Tempe, AZ 85284, USA, 14 pgs.

Feder, et al., "Maximum Likelihood Noise Cancellation Using the EM Algorithm," IEEE Transactions on Acoustics, Speech, and Signal Processing, vol. 37, No. 2, Feb. 1989, pp. 204-216. No Day.

Glentis, et al., "A Unified View—Efficient Least Squares Adaptive Algorithms for FIR Transversal Filtering," IEEE Signal Processing Magazine, Jul. 1999, pp. 13-41. No Day.

Breining, et al.,"Acoustic Echo Control—An Application of Very-High-Order Adaptive Filters," IEEE Signal Processing Magazine, Jul. 1999, pp. 42-69. No Day.

\* cited by examiner

ECHO CANCELLATION FILTER

TECHNICAL FIELD

The present invention relates to telecommunication filtering and, more specifically, to echo cancellation in communication links.

BACKGROUND OF THE INVENTION

Hands-free speaker phones continue to be increasingly popular in modern day society. Advantageously a speaker phone allows users free use of their hands and to move about in the proximity of the speaker phone. Speaker phones employ a loudspeaker and a microphone to establish a bi-directional voice communication link between a local user in a near-end location and a remote user in a far-end location. The loudspeaker transmits the speech of the remote user, and the microphone detects the speech of a local user.

Typically, the near-end location is an enclosure, such as a room or an automobile. The speech of the remote user is emitted from the loudspeaker, echoes throughout the enclosure, is received by the microphone, and is transmitted back to the remote user in the far-end location. The echoes create unacceptably disruptive feedback for the far-end user.

A solution is to incorporate an echo canceler to cancel echoes received by the microphone. Echo cancelers synthesize an echo signal that matches the echoes of the voice signal of the remote user that are received by the microphone. If the synthesized echo signal matches perfectly the actual echo received by the microphone, then a signal without echo can be generated by subtracting the synthesized echo from the microphone signal. The difference is the echo canceled signal which can be returned to the far-end location. Typically, the mechanism used to create the synthetic echo signal is a filter implemented in the time-domain, the frequency-domain, or operating in frequency subbands. The input to the filter is the signal from the far end (the same signal is emitted from the loud speaker). The filter output is the synthetically generated echo signal.

The echo canceler preferably uses an adaptive filter so that the filter's parameters (tap coefficients for time-domain implementations or bin weights for frequency-domain implementations) are modifiable to improve a match of the synthesized echo signal to the actual echo in the microphone signal. The closeness of the match between the actual and synthesized echo is typically measured by the power, or some other second-order statistic, in the echo canceled signal. A limitation of this measure is that it is accurate when only the remote user is speaking and the local user is not.

In conversations between people, the status of the conversation can be in one of four possible states. The event when the remote user is speaking but the local user is not is called "far-end talk." Conversely, the "near-end talk" event is when the local user is speaking but the remote user is silent. The "double-talk" event occurs when both users speak simultaneously. When neither person speaks, the event is called "silence." In a telephone conversation, people usually take turns speaking. Therefore, in the absence of any other sources of sound, the most common events are "far-end talk" and "near-end talk."

The three non-silence events can arise due to background noises or other sources of sound on either end of the communication link. For example, if there is a radio operating in the near-end, then the state of the conversation can be in either the near-end talk event (if no sound is coming from the far-end) or the double-talk event (if there is sound coming from the far-end). However, the state cannot be in the silence or a far-end talk event since these events require silence in the near-end. A radio is a persistent near-end acoustic source.

For the purpose of echo cancellation, it is important to distinguish between the four types of events. The echo canceler cannot distinguish speech from any other type of acoustic signal, such as a radio, a dishwasher, or a dog barking. Therefore, from the echo canceler's perspective, double-talk occurs whenever the loud speaker is broadcasting sound simultaneously with sound being produced in the near-end room regardless of the original source of those sounds. Due to background noises at either end of the communication link, double-talk may be the most common condition in a hands-free telephone conversation using speaker-phones.

During periods of silence and near-end talk, there is not a far-end signal being emitted from the loud speaker. Therefore, there are no echoes to be canceled and the echo canceler is turned off. When far-end talk is detected, the echo canceler adjusts the parameters of the adaptive filter to synthesize an echo signal that matches the echo signal arriving at the microphone. Typical echo cancelers can operate effectively only during far-end talk. When double-talk occurs, the microphone signal consists of a sum of a near-end signal and echoes of the far-end signal. The presence of the near-end signal in the microphone signal causes incorrect adjustment of the adaptive filter which in turn hinders proper echo synthesis. The effect produces audible echoes in the signal sent back to the far-end. To prevent the feedback of echoes, the echo-canceler suspends modification of the adaptive filter. Typically, an echo-canceler includes a double-talk detector to determine the presence of a double-talk event and control the adaptive filter accordingly. During double-talk, the adaptive filter is still synthesizing an echo signal that can be used for cancellation. Only the time varying adjustment of the adaptive filter parameters is suspended.

While the adaptive filter modification is suspended the echo paths of the enclosure may change as people move and interact with objects. Changes in the enclosure response cause changes in the echoes of the far-end signal that arrive at the microphone. Because the adaptive filter modifications have been suspended, the synthetic echo produced by the adaptive filter still matches the old echo but not the new. When the old synthetic echo is subtracted from the microphone signal, that now contains echoes due to the new enclosure response, the echoes are not canceled. The near-end signal, along with the uncanceled portion of the far-end echo are returned to the far-end. Even small changes in the echo paths of the enclosure can lead to loud echoes in the signal returned back to the far-end. To avoid sending loud echoes to the far-end, the echo canceler switches into a half-duplex mode of operation and the far-end signal is set to zero. Half-duplex communication is unnatural and hinders communication.

The bulk of the research and development in the field of echo cancellation has focused on two problems. First, the adaptive filters in echo cancelers must have very long responses to accurately match the real enclosure response. This presents a significant problem in its own right and a great deal of research has attempted to find practical implementations of very long filters that converge quickly to the enclosure response during far-end talk event. The second main focus of echo cancellation research has aimed to improve the ability of double-talk detectors to determine the instant that double-talk begins to occur. To date, there has been relatively little attention paid to the possibility that the adaptive filter may be adaptable to cancel echoes during the double-talk event. Existing attempts at adaptive filtering during double-talk have not provided an adequate solution for echo cancellation.

One approach has been to use a blind deconvolution technique for adaptive filtering during double talk. Blind deconvolution is a technique for separating a convolutive mixture, such as a mixture that takes place over space and time. A straight forward application of blind deconvolution techniques produces at best only a filtered version of the near-end signal which gives it an unnatural quality.

An improvement to the blind deconvolution technique is to provide a short-term whitening, learn the echo path response on the whitened signal by blind deconvolution, and apply the adapted filter on the original unwhitened signal. The resulting gradient descent technique adapts too slowly for real-time applications. Furthermore, this technique can only cancel long-delay echoes but not echoes occurring in the span of the short-term whitening process.

Thus, a need exists to provide an improved echo canceler system that modifies the adaptive filter parameters during double-talk and eliminates the need for half-duplex operation. Such an invention is disclosed herein.

SUMMARY OF THE INVENTION

The present invention provides an echo cancellation structure and technique for use in a communication link. The present invention has particular application with hands-free speaker telephones as it is effective in reducing echoes resulting from far-end signals. The echo canceler includes an adaptable filter that may be updated not only during far-end talk as in a traditional echo canceler but also during double-talk. The echo canceler receives a far-end signal and a microphone signal and produces an echo-canceled signal.

Internally, the echo canceler consists of adaptive processing elements that force the echo-canceled signal to be as statistically independent as possible from the far-end signal. The adaptive processing elements may include whitening processors or decorrelators and adaptive filters. An adaptive filter includes a vector of coefficients that are updated by an adaptation module.

The whitening processors or decorrelators remove correlation that exists between two or more signals. For example let $x_1(t)$, $x_2(t)$, $x_3(t)$ be three signals with cross correlation $R_x(i, j)=E(x_i(t)x_j(t))$, where i, j $\in$ {1, 2, 3}. If these three signals are fed into a decorrelation processor, the corresponding outputs $y_1(t)$, $y_2(t)$, $y_3(t)$ have cross correlation $R_y(i, j)=E(y_i(t)y_j(t))$ that satisfies, $$R_y(i, j) = \begin{cases} 1_{i=j}, \\ 0_{i \neq j} \end{cases}.$$

Generally, the number of inputs to a decorrelation processor and the number of outputs are equal.

A decorrelator can be configured to temporally decorrelate (whiten) a given signal by inputting to the decorrelator several time-delayed replicas of the signal. By letting $x_1(t)$ =s(t), $x_2(t)$=s(t-1), and $x_3(t)$=s(t-2) as in the previous example, temporal decorrelation is accomplished, i.e., $y_1(t)$, $y_2(t)$, and $y_3(t)$ are temporally decorrelated (or whitened) versions of the signal s(t). When a decorrelator is configured to temporally whiten a given signal, the decorrelator generally has the given signal as its only input. The decorrelator produces the time-delayed replicas of the given signal internally and outputs as many whitened samples as desired. Therefore, a whitening processor may have only one input but may have a large number of outputs.

Generally, the number of whitened outputs is equal to the number of delays of the input signal that are generated internally. The operations of temporal whitening and decorrelating multiple signals are both performed in the present invention. There are a wide variety of algorithms for whitening or decorrelating data that may be used.

The echo canceler receives the far-end signal and the microphone signal. Using the temporal decorrelator, the far-end signal is temporally whitened and then the microphone signal is decorrelated from the multiple whitened lags of the far-end signal. The result is a set of uncorrelated variables: uncorrelated lags of the far-end signal and a decorrelated microphone signal.

In one embodiment, the time delays of the far-end signal $s_1(t)$ are explicitly generated and input to a decorrelation processor to generate multiple whitened lags of the far-end signal. A second decorrelation processor is also used to remove the correlation between the microphone signal $x_2(t)$ and the whitened lags of the far-end signal. All of the whitened and decorrelated outputs are fed into a blind source separation adaptive processing module which extracts the echo canceled signal $y_2(t)$.

In an alternative embodiment, the echo canceler incorporates well known recursive least-squares processing structures, a RLS systolic array or a RLS least-squares lattice-ladder structure, to perform both temporal whitening and decorrelation of the microphone signal. As can be appreciated by one of skill in the art, other variations and algorithms are also possible.

The initial whitening process is not strictly necessary to enable echo cancellation during a double-talk event. To one skilled in the art, whitening processing can be seen as performing a partial echo cancellation. Because the microphone signal consists of the near-end signal plus multiple time delays of the far-end signal, by decorrelating the microphone signal with time delays of the far-end signal, the echoes of the far-end signal in the decorrelated microphone signal will be reduced. However, decorrelation is only a second order statistical criteria.

To generate an echo canceled signal that is truly independent from the far-end signal, further processing is needed. One approach is to exploit the non-gaussianity of the near-end signal and force echo canceled signal to be statistically independent of the far-end signal by maximizing its non-gaussianity. This approach invariably involves the optimization of higher than second order statistical criteria. Another technique to force independence is to exploit the non-stationarity of the near-end signal. Exploiting non-stationarity will be readily understood by one of skill in the art. However, for exemplary purposes the non-gaussian measure of independence/separation is used as the selected criterion of measure.

The multiple, temporally decorrelated delays of the far-end signal and the decorrelated microphone signal are linearly combined by the adaptive filter to produce the echo canceled signal. The same set of signals are also presented to the adaptation module so that the adaptation module can compute updates to the adaptive filter coefficients. The adaptation module applies a blind source separation algorithm based on a criterion that measures the non-gaussianity of the echo canceled signal. It is desired to extract only one source, the near-end source signal, from the mixture of all the echoes that arrive at the microphone. Therefore, one-unit source separation algorithms will be recognized by one skilled in the art (of blind source separation/independent component analysis) as being an appropriate family of separation algorithms to be used by the adaptation module.

In an alternative embodiment, parallel source separation algorithms may be used. However, implementation of parallel source separation algorithms are more expensive, and only one of the computed outputs is kept in any event. Because the echo canceler measures the statistical independence between the echo canceled signal and the far-end signal, the echo canceler is capable of adapting during double-talk events. Therefore, the echo canceler of the present invention does not need to use a double-talk detector.

The same adaptation algorithm can be used during double-talk as during far-end talk. Adaptation during double-talk avoids the situation leading to the need for switching into half-duplex communication. The communication is full-duplex all the time enabling natural face-to-face type telephone conversations between the near-end and far-end users.

A double talk detector is not needed in the present invention but may be used anyway to optimize performance. During double talk, the adaptation module should maximize the statistical independence between the echo canceled signal $y_2(t)$ and the far-end signal $s_1(t)$. This enables adaptation to changes in the room/enclosure response during double talk. When the double talk detector determines that there is a far-end signal only, the operation of the adaptation module may switch to minimize a second order statistical criteria (such as is common in existing echo cancelers) which may allow more rapid echo cancellation during far-end only talk.

Additional aspects and advantages of this invention will be apparent from the following detailed description of preferred embodiments, which proceeds with reference to the accompanying drawings.

BRIEF DESCRIPTION OF THE DRAWINGS

Non-exhaustive embodiments of the invention are described with reference to the figures in which.

DETAILED DESCRIPTION OF PREFERRED EMBODIMENTS

Figure 1:
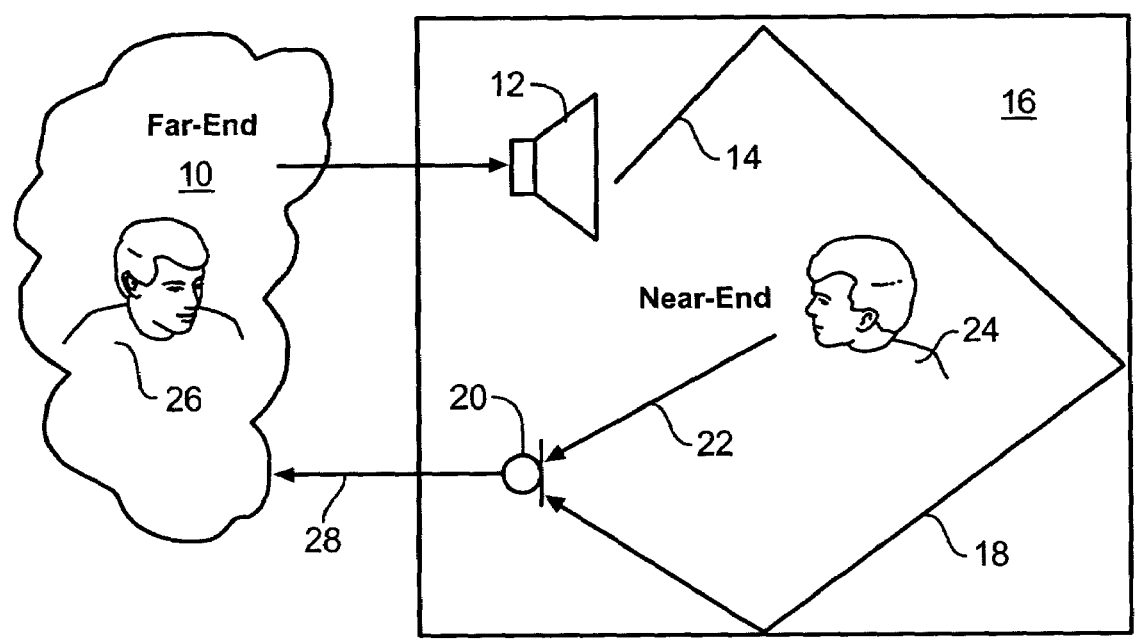
FIG. 1 is a block diagram illustrating a communication link having a loud speaker, enclosure, microphone, and a near-end user system.

Reference is now made to the figures in which like reference numerals refer to like elements. For clarity, the first digit or digits of a reference numeral indicates the figure number in which the corresponding element is first used.

Throughout the specification, reference to "one embodiment" or "an embodiment" means that a particular described feature, structure, or characteristic is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. Those skilled in the art will recognize that the invention can be practiced without one or more of the specific details, or with other methods, components, materials, etc. In other instances, well-known structures, materials, or operations are not shown or not described in detail to avoid obscuring aspects of the invention.

Referring to FIG. 1, a communication link is shown such as exists in a hands-free telephone conversation using speaker phones. A signal arrives from a far-end 10 and is transmitted through a loudspeaker 12. The resulting acoustic wave 14 propagates throughout an enclosure 16, such as a room. The wave 14 is reflected by hard objects such as walls, furniture, bodies, and produces an echo path 18. Only one echo path 18 is depicted in FIG. 1 for illustrative purposes, but as can be appreciated, in a real environment many echo paths exist.

A microphone 20 receives the echo signal 18. Echoes vary in attenuation experienced during propagation and by differing echo path lengths. Therefore, the echo arrivals are spread out in time. The microphone 20 also receives a near-end acoustic wave 22 produced by, for example, a local person 24.

A remote person 26 at the far-end 10 of the communication link wants to hear the local person 24. Unfortunately, the microphone signal 28 is a mixture of both the desired near-end acoustic wave 22 and unwanted echoes 18 of the far-end acoustic wave 14. The echoes 18 should be removed from the microphone signal 28 so that the remote person 26 does not hear himself. Echo cancellation may be achieved through echo cancellation hardware and/or software.

Figure 2:
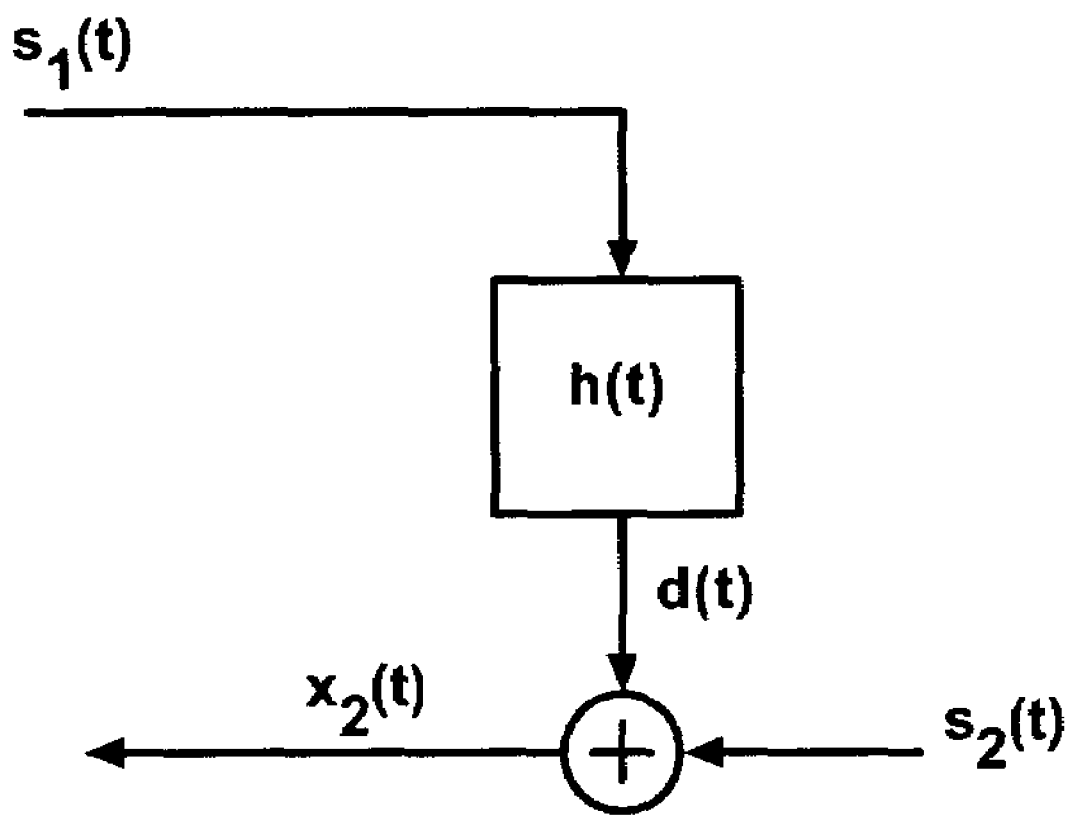
FIG. 2 is a block diagram illustrating a discrete-time signal processing equivalent of FIG. 1.

Referring to FIG. 2, a mathematical illustration of a discrete time signal processing equivalent of FIG. 1 is shown. In FIG. 2, d(t) is a superposition of all the echoes of the far-end signal $s_1(t)$. The function, h(t), is used to represent the echo path between the speaker 12 and the microphone 20. The near-end signal is $s_2(t)$ and the microphone signal $x_2(t)$ is the sum, $$x_2(t)=s_2(t)+d(t)=s_2(t)+h(t)*s_1(t),$$

where * represents a convolution.

Figure 3:
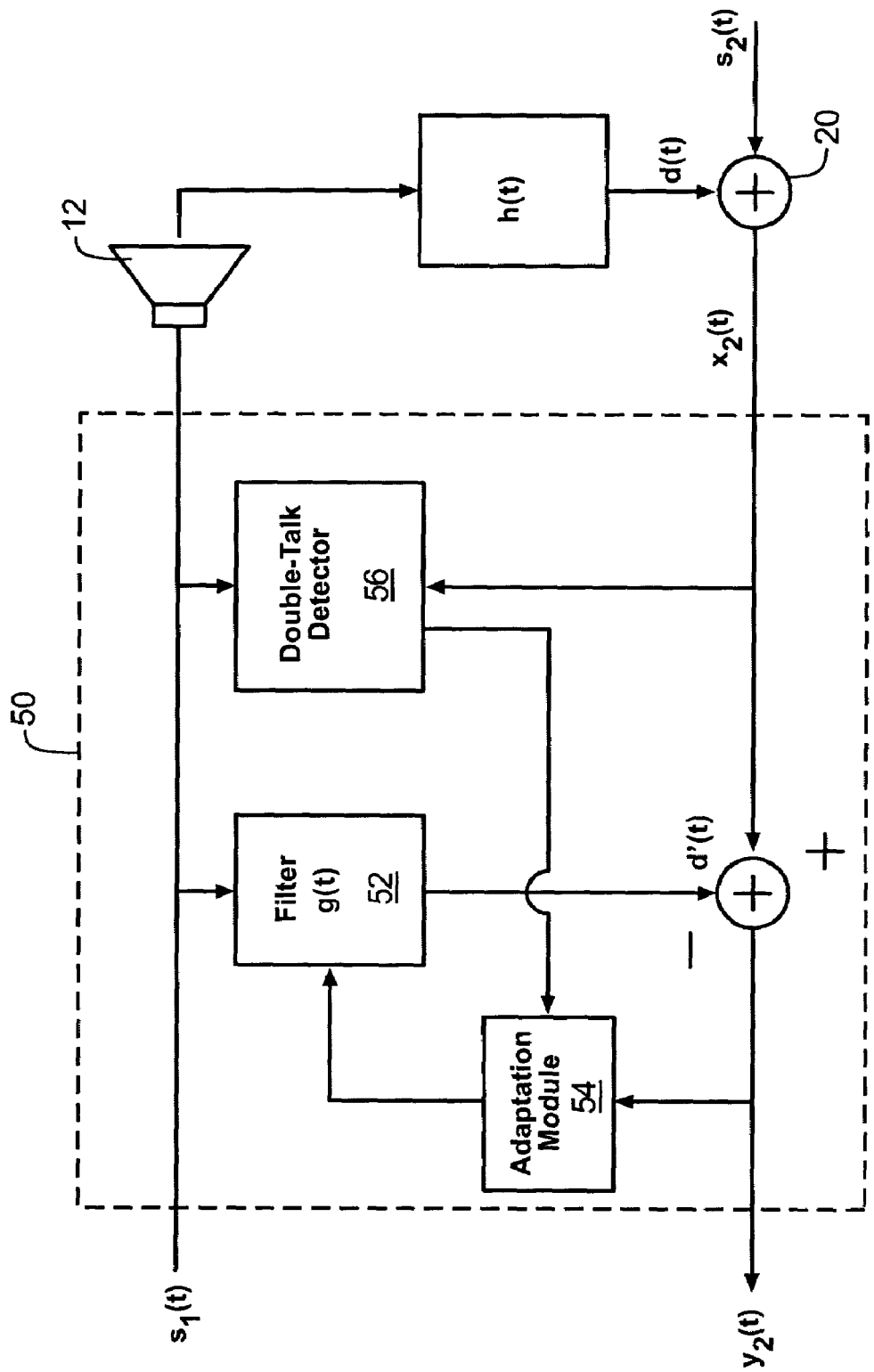
FIG. 3 illustrates a basic echo canceler configuration.

Referring to FIG. 3, a block diagram illustrates an echo canceler 50 incorporated into the mathematical illustration of FIG. 1. The echo canceler 50 is in electrical communication with the far-end signal and the microphone signal. The signals shown in FIG. 3 are set out in Table 1.

TABLE 1

Definitions of Signals

| Signal | Definition |
| --- | --- |
| $S_1(t)$ | Far-end signal |
| $S_2(t)$ | Near-end signal |
| $X_2(t)$ | Microphone signal |
| $Y_2(t)$ | Echo canceled signal sent back to far-end |
| $D(t)$ | Echo signal at the microphone |
| $D'(t)$ | Estimated or synthesized echo signal |
| $H(t)$ | Impulse response of the enclosure from the speaker to the microphone |
| $G(t)$ | Echo cancellation filter |

The foregoing signal definitions are further used throughout the body of the present application.

The echo canceler 50 includes a filter 52 that provides a function, g(t), to filter the far-end signal $s_1(t)$ and produce an estimate d'(t) of the echo signal d(t). The echo canceler 50 subtracts d'(t) from the microphone signal, $x_2(t)$. The echo canceled signal, $y_2(t)$, may be written as, $$y_2(t)=s_2(t)+d(t)-d'(t)=s_2(t)+[h(t)-g(t)]*s_1(t).$$

When the echo estimation is perfect, d'(t)=d(t), then the echo canceled signal reduces to $y_2(t)=s_2(t)$, which is the desired result. The echo canceler 50 returns to the far-end 10 a replica of the near-end signal $s_2(t)$ without an echo. Perfect echo cancellation is possible when g(t)=h(t). When the response of the filter, g(t), matches the actual echo response of the enclosure h(t), then the echoes in the microphone signal $x_2(t)$ can be canceled by subtraction.

A practical strategy to achieve echo cancellation is to have the filter 52 be an adaptive filter. One such adaptive filter is a finite impulse response (FIR) filter that has a vector of coefficients that are modifiable.

The echo canceler 50 may further include an adaptation module 54 that is in communication with the filter 52 to provide coefficient updates. The adaptation module 54 receives the $y_2(t)$ signal which ideally is zero during the single-talk event of the remote user 26 speaking. The adaptation module 54 modifies the parameters in the function, g(t), until the matching condition g(t)=h(t) is achieved. In one implementation, the adaptation module may use a second order statistical criterion to adapt the filter function g(t).

A limitation of this approach is that filters can only be adapted during the single-talk event in which only the far-end signal $s_1(t)$ is "on" and the near-end signal is $s_2(t)$ "off" so that $s_2(t)=0$. During this event, the undesired echo signal d(t) entirely comprises the microphone signal $x_2(t)$. The adaptation module is then able to determine if subtraction of the estimated echo signal d'(t) from $x_2(t)$ eliminates the echo signal d(t).

The echo canceler 50 further includes a double-talk detector 56 in communication with $x_2(t)$ to identify a double-talk event. During a double-talk event, the double-talk detector 56 signals the adaptation module 54 to suspend adaptation of g(t). During double-talk, g(t) is still producing echo estimates, d'(t), but the filter parameters are not updated.

Another consideration is that the enclosure is rarely static. For example, doors and windows may open and close, people may move, enter and leave, and people may move objects. These events may occur while updates to g(t) are turned off and change the echo impulse response h(t). If h(t) changes while the updating to g(t) is turned off, a residual echo is introduced into the echo canceled signal, $y_2(t)$. The residual echo depends on the difference between h(t) and g(t) and is given as, $$\text{residual echo}=d(t)-d'(t)=[h(t)-g(t)]*s_1(t).$$

The size of the residual echo depends on the size of the error, h(t)−g(t). If large enough changes take place in h(t), large echoes are introduced into the echo canceled signal $y_2(t)$. To avoid sending loud echoes back to the far-end 10, the echo canceler 50 goes into a half-duplex mode of operation in which $y_2(t)$ is set to zero. Half-duplex communication enforces the single-talk condition but is unnatural and very annoying to people.

The present invention provides an echo canceler that effectively updates an echo cancellation filter function g(t) during double-talk and thus avoids the need for double talk detection and half-duplex operation. The present invention forces the echo canceled signal $y_2(t)$ to be statistically independent of the far-end signal $s_1(t)$. In so doing, the present invention addresses echo cancellation as a blind source separation problem in which the source signals can be divided into two independent groups. A first group includes the many correlated echoes, $s_1(t-i)$, of the far-end signals $s_1(t)$. All of the correlated echoes are weighted and summed together to form the signal, $$d(t)=\sum_{l=0}^{L-1}h(l)s_1(t-l).$$

A second group includes the single near-end signal, $s_2(t)$. This allows blind source separation techniques to be applied with modifications to account for different assumptions. Usually, algorithms for separating instantaneous mixtures are simpler in mathematical derivation and in computational aspects of algorithms than those for separating convolutive mixtures.

In the blind source separation problem, a collection of N independent signals $s_1(t), \ldots, s_N(t)$ arrive at N sensors, such as microphones. The sensors are situated so that each sensor obtains an independent observation of the sources. The sensor signals are given by, $$x_i(t)=\sum_{j=1}^{N}a_{i,j}s_j(t),$$

where $i=1,\ldots,N$. These equations can be summarized using a single matrix/vector equation, $$x(t)=As(t),$$

where, $$x(t)=\begin{bmatrix}x_1(t)\\ \vdots \\ x_N(t)\end{bmatrix}, A=\begin{bmatrix}a_{1,1} & \ldots & a_{1,N}\\ \vdots & & \vdots \\ a_{N,1} & \ldots & a_{N,N}\end{bmatrix}, s(t)=\begin{bmatrix}s_1(t)\\ \vdots \\ s_N(t)\end{bmatrix}.$$

Several different techniques exist for recovering the sources s(t) from the measurements x(t). A general division exists between those methods that extract sources one at a time (called single-unit algorithms) and those that separate the sources all at once (called parallel algorithms). For the echo-cancellation application, a one-unit algorithm is used. Therefore, the essential elements of the one-unit algorithms will be presented.

Blind source separation of the sources is possible by exploiting the fact that the probability density function of a mixture of independent signals tends to be more gaussian than the probability density function of any of the independent signals. Because the mixing is linear, the separation operation is also linear. Where $y(t)=w^T x(t)$ is a linear component, separation can be accomplished by forcing y(t) to be non-gaussian in nature. Separation amounts to choosing the right w and the next step is a method for measuring the gaussianity of y(t).

In one embodiment, the negentropy may be used as a candidate measure although other measures may be used such as kurtosis. A reasonable approximation to negentropy is given by, $$J(y) \approx [E\{G(y)\} - E\{G(v)\}]^2,$$

where E is the expectation operator, v is a zero-mean, unit-variance guassian random variable, and G(y)=log cosh y. An independent component is extracted, i.e., and independent source is separated, by maximizing $J(y)=J(w^T x)$. That w have a unit length $\|w\|_2=1$ is important to the optimization of negentropy. A spatial whitening preprocessing step is also required.

Application of the blind source separation is now made with respect to an echo cancellation filter. A microphone signal $x_2(t)$ may be given as, $$x_2(t) = s_2(t) + \sum_{l=0}^{L-1} g(l)s_1(t-l)$$

$$= [g(L-1) \ldots g(1), g(0), 1] \begin{bmatrix} s_1(t-L+1) \\ \vdots \\ s_1(t-1) \\ s_1(t) \\ s_2(t) \end{bmatrix}.$$

The samples of the far-end signal, $s_1(t)$, can be thought of as perfect measurements of different sources albeit strongly correlated sources. Echo cancellation amounts to separation of the source of the near-end signal, $s_2(t)$, from the mixture of the microphone signal, $x_2(t)$. The echo cancellation can be put into the form of a blind source separation problem as follows, $$x(t) = \begin{bmatrix} s_1(t-L+1) \\ \vdots \\ s_1(t) \\ - \\ x_2(t) \end{bmatrix} = \begin{bmatrix} 1 & & & | & 0 \\ & \ddots & & | & \vdots \\ & & 1 & | & 0 \\ - & - & - & - & - \\ h(L-1) & \cdots & h(0) & | & 1 \end{bmatrix} = As(t).$$

Since the sources are not independent but rather can be divided into two independent groups (corresponding to the strongly correlated delays of the far-end signal $s_1(t)$ and the single sample of the near-end signal $s_2(t)$), the equation does not fit the blind source separation exactly. However, the near-end signal, $s_2(t)$, is independent of any of the other signals $s_1(t-i)$ and that is all that is required. In blind source separation, the mixing matrix A is unknown. However, in the echo cancellation application, the mixing matrix is known except for the first L elements on the last row since this is the unknown impulse response of the enclosure.

Before applying the one-unit negentropy separation algorithm to the blind echo cancellation problem, the data x(t) is whitened. In one embodiment, for whitening, an efficient RLS lattice-ladder structure may be used. The gradient negentropy algorithm is then applied to separate $s_2(t)$ from $x_2(t)$. One of skill in the art will appreciate that any number of other optimization algorithms may also be used and would be included within the scope of the invention. Thus, gradient descent is used herein for exemplary purposes only.

Figure 4:
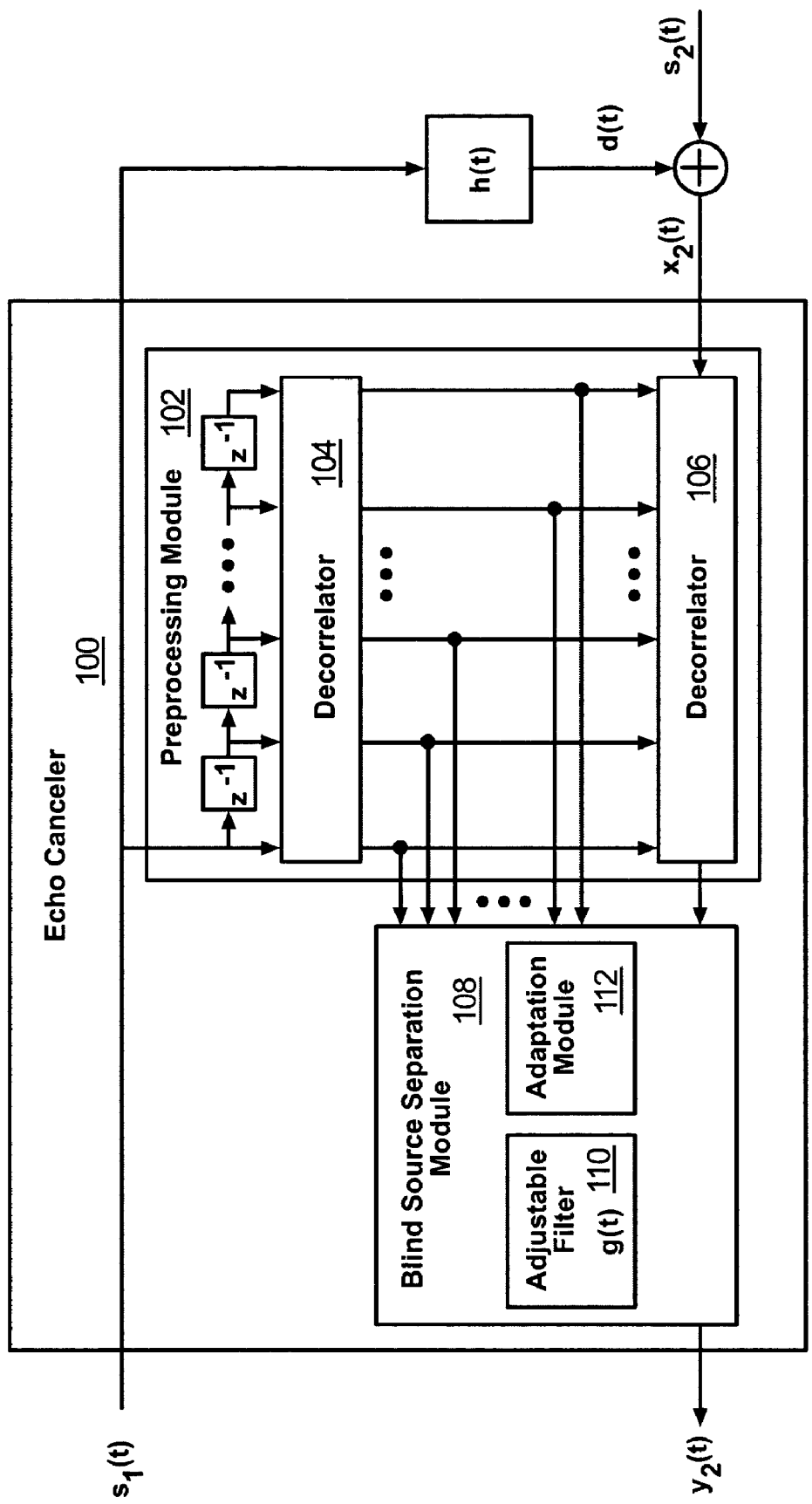
FIG. 4 is a block diagram illustrating an embodiment of elements of an echo canceler.

Referring to FIG. 4, a block diagram is shown illustrating elements of the echo canceler 100 of the present invention. The echo canceler 100 includes a preprocessing module 102 to receive and whiten the far-end signal $s_1(t)$ and receive the microphone signal $x_2(t)$ and remove correlation with $s_1(t)$. The preprocessing module 102 includes first and second decorrelators 104, 106. In the present invention, the first decorrelator 104 temporally whitens the far-end signal $s_1(t)$ and the second decorrelator 106 removes correlation between the microphone signal $x_2(t)$ and the whitened lags of the far-end signal $s_2(t)$. The second decorrelator 106 receives whitened lags from the first decorrelator 104 in order to compare and remove the far-end signal $s_2(t)$.

The entire set of decorrelated signals, the whitened lags of $s_1(t)$ and the decorrelated version of $x_2(t)$, are input to a blind source separation module 108. The blind source separation module 108 includes an adjustable filter 110 having adjustable coefficients. The adjustable filter 110 has a filtering function g(t) that has a vector of adjustable coefficients. The adjustable filter 110 may be a FIR filter. Other filters may be used as well. The adjustable filter 110 weights and combines the set of inputs to produce the echo canceled signal $y_2(t)$.

The blind source separation module 108 further includes an adaptation module 112. The adaptation module 112 adjusts the filter coefficients to make the echo canceled signal $y_2(t)$ statistically independent of the far-end signal $s_1(t)$ in accordance with blind source separation techniques discussed above. The echo cancellation problem is cast as a one-unit blind source separation problem. A one-unit blind source separation algorithm emphasizes a measure of criteria to increase the statistical independence of the near-end signal from the far-end signal. In one embodiment, negentropy maximization of the echo canceled signal can be used.

An example of a gradient update algorithm for minimizing the negentropy of $y_2(t)$ is as follows:
1. Choose an initial $w_0$ of unit norm $\|w\|_2=1$, an initial value for $y_0$, and let k=0;
2. Update $w'_{k+1}=w_k+\alpha\gamma_k x_k g(w_k^T x_k)$;
3. Normalize $w_{k+1}=w'_{k+1}/\|w'_{k+1}\|_2$;
4. Update $\gamma_{k+1}=(1-\alpha)\gamma_k+\alpha(G(W_k^T x_k)-E\{G(v)\})$;
5. Increment k and go to Step 2.

In one embodiment of this algorithm G(y)=log cos h(y) and g(y) is the derivative of G(y), g(y)=tan h(y). Other functions could also be used. For example, if $G(y)=y^4$ a kurtosis maximization algorithm results. The main requirements are that G(y) be a smooth even function that does not grow too fast so that the algorithm is robust to outliers in the data.

Figure 5:
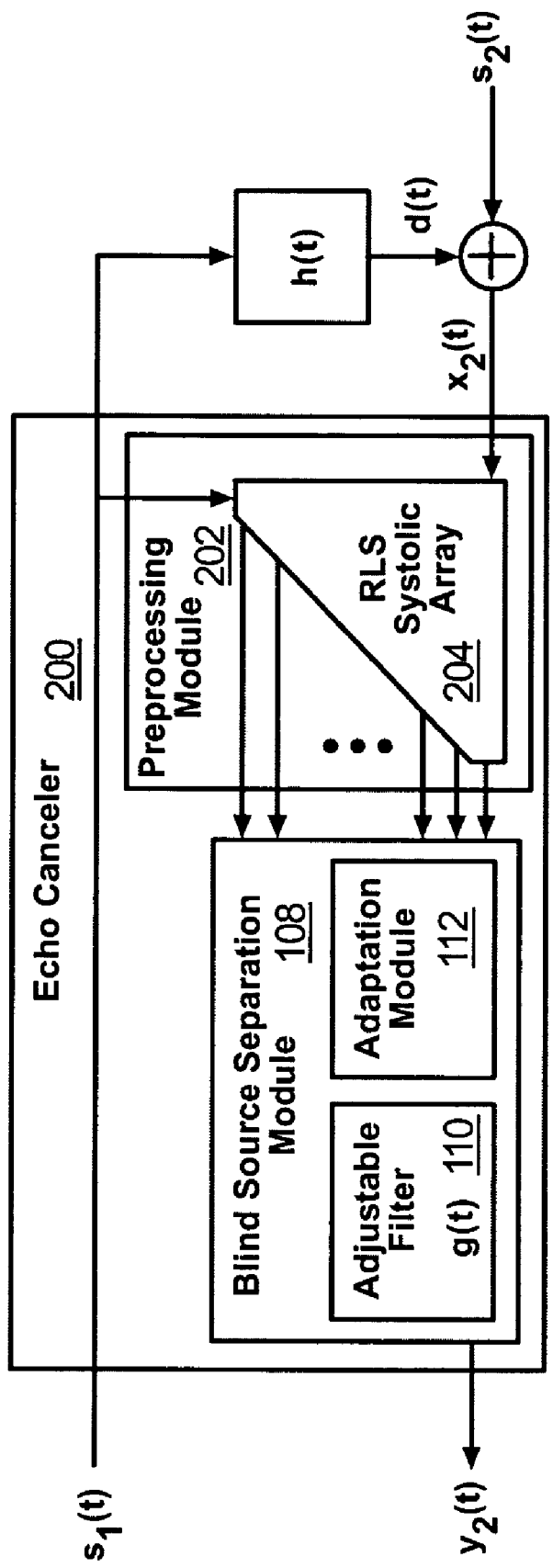
FIG. 5 is a block diagram illustrating an embodiment of an echo canceler.

Referring to FIG. 5, an alternative embodiment of an echo canceler 200 is shown. The echo canceler 200 includes a preprocessing module 202 having a recursive least-squares processing structure such as a RLS systolic array 204. The RLS systolic array 204 receives the far-end signal $s_1(t)$ and performs a temporal whitening. The RLS systolic array 204 also receives the microphone signal $x_2(t)$ and decorrelates the signal. The blind source separation module 108 is similar to that previously described.

Figure 6:
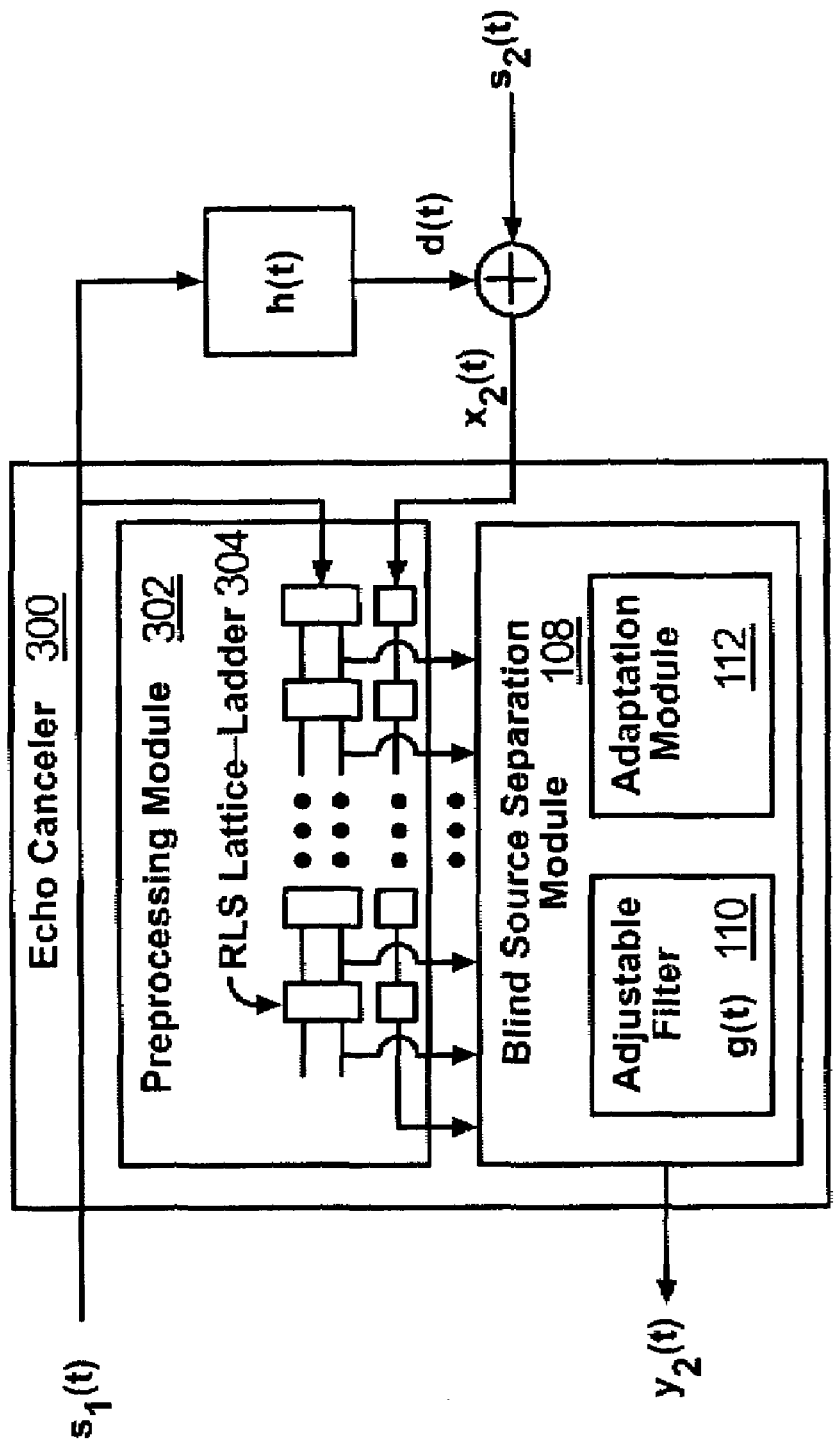
FIG. 6 is a block diagram illustrating an alternative embodiment of an echo canceler.

Referring to FIG. 6, an alternative embodiment of an echo canceler 300 is shown. A preprocessing module 302 includes a RLS lattice-ladder structure 304 to perform both temporal whitening of the far-end signal $s_1(t)$ and decorrelation of the microphone signal $x_2(t)$. As can be appreciated by one of skill in the art, other variations of the preprocessing module 302 are possible and are included within the scope of the invention.

The present invention provides an echo canceler that adapts a filter during double-talk as well as far-end talk. The echo canceler adapts very quickly and is applicable to real-time communication. The echo canceler does not use a double-talk detector and avoids all problems inherent with their use. Thus, speaker phones, and other communication devices, can continuously operate in full-duplex mode of operation thereby providing natural conversational hands-free communication.

It will be obvious to those having skill in the art that many changes may be made to the details of the above-described embodiments without departing from the underlying principles of the invention. The scope of the present invention should, therefore, be determined only by the following claims.

The invention claimed is:

1. An echo canceler for reducing echoes resulting from a far-end signal and adaptable during a double-talk event, the echo canceler comprising:
   an adaptable filter to filter the received far-end signal and provide an echo estimate; and
   an adaptation module in communication with the adaptable filter to update the adaptable filter during a double-talk event, the adaptation module to receive a microphone signal and separate a near-end signal from the microphone signal using a blind source separation algorithm.

2. The echo canceler of claim 1, wherein the adaptable filter includes a finite infinite response filter.

3. The echo canceler of claim 1, wherein the echo canceler further includes a preprocessing module in communication with the adaptable filter and adaptation module, the preprocessing module to whiten the far-end signal and decorrelate the microphone signal.

4. The echo canceler of claim 3, wherein the preprocessing module includes,
   a first decorrelator to receive and whiten the far end signal, and
   a second decorrelator to receive and decorrelate the microphone signal.

5. The echo canceler of claim 3, wherein the preprocessing module includes a recursive least-squares structure.

6. The echo canceler of claim 5, wherein the preprocessing module includes a recursive least-squares systolic array.

7. The echo canceler of claim 5, wherein the preprocessing module includes a recursive least-squares lattice-ladder.

8. The echo canceler of claim 3, wherein the preprocessing module maximizes a criterion of measure to increase the statistical independence of the near-end signal.

9. The echo canceler of claim 8, wherein the criterion of measure is negentropy.

10. The echo canceler of claim 1, wherein the blind source separation algorithm is a gradient negentropy algorithm.

11. A method for reducing echoes resulting from a far-end signal, the method comprising:
   receiving a microphone signal including a near-end signal and echoes;
   applying a blind source separation algorithm to the microphone signal to separate the near-end signal;
   updating an adaptable filter based on the echoes during a double-talk event;
   the adaptable filter, filtering the far-end signal to provide an echo estimate; and
   applying the echo estimate to a microphone signal to substantially remove echoes.

12. The method of claim 11, wherein the adaptable filter comprises a finite impulse response filter.

13. The method of claim 11, further comprising:
   whitening the far-signal; and
   decorrelating the near-end signal from the microphone signal.

14. The method of claim 13, wherein whitening the far-end signal is performed by a first decorrelator and decorrelating the near-end signal is performed by a second decorrelator.

15. The method of claim 13, wherein whitening the far-end signal and decorrelating the near-end signal is performed by a recursive least-squares structure.

16. The method of claim 15, wherein the recursive least-squares structure is a recursive least-squares systolic array.

17. The method of claim 15, wherein the recursive least-squares structure is a recursive least-squares lattice-ladder.

18. An echo canceler for receiving a microphone signal including a near-end signal and echoes resulting from a far-end signal, the echo canceler reducing the echoes and adaptable during a double-talk event, the echo canceler comprising:
   a preprocessing module to whiten the far-end signal and reduce signal correlation in the microphone signal; and
   a blind source separation module, in communication with the preprocessing module and including,
      an adaptable filter to filter the whitened far-end signal and provide an echo estimate, and
      an adaptation module to update the adaptable filter during a double-talk event and to receive the decorrelated microphone signal and separate the near-end signal from the microphone signal using a blind source separation algorithm.

19. The echo canceler of claim 18, wherein the adaptable filter includes a finite impulse response filter.

20. The echo canceler of claim 18, wherein the preprocessing module includes,
   a first decorrelator to receive and whiten the far end signal, and
   a second decorrelator to receive and decorrelate the microphone signal.

21. The echo canceler of claim 18, wherein the preprocessing module includes a recursive least-squares structure.

22. The echo canceler of claim 21, wherein the preprocessing module includes a recursive least-squares systolic array.

23. The echo canceler of claim 21, wherein the preprocessing module includes a recursive least-squares lattice-ladder.

* * * * *

UNITED STATES PATENT AND TRADEMARK OFFICE
CERTIFICATE OF CORRECTION

PATENT NO. : 6,996,229 B2  
APPLICATION NO. : 10/616001  
DATED : February 7, 2006  
INVENTOR(S) : Jacob H. Gunther Page 1 of 1

It is certified that error appears in the above-identified patent and that said Letters Patent is hereby corrected as shown below:

On the title page, item [56]:
    Page 1, OTHER PUBLICATIONS, line 10, change "Torkkola, Karl" to --Torkkola, Kari--

Page 2, OTHER PUBLICATIONS, line 1, change "Torkkola, Karl" to --Torkkola, Kari--

Column 4, line 48, "...force echo canceled signal..." change to --force the echo canceled signal--

Column 6, line 17, "...furniture, bodies, and produces..." change to --furniture, and bodies, and produces--

Column 8, line 25, "...arrive at N sensors,..." change to --arrives at N sensors,--

Column 9, lines 8-9, "...and G(y)=log cosh y..." change to --and G(y)=log cosh(y)--

Column 9, lines 9-10, "...i.e., and independent source..." change to --i.e., an independent source--

Column 10, line 40, "...algorithm G(y)=log cos h(y)..." change to --algorithm G(y)=log cosh(y)--

Column 10, line 41, "...g(y)=tan h(y)..." change to --g(y)=tanh(y)--

Signed and Sealed this

Tenth Day of November, 2009

David J. Kappos  
*Director of the United States Patent and Trademark Office*